United States Patent [19]
Plotzker

[11] Patent Number: 5,939,158
[45] Date of Patent: Aug. 17, 1999

[54] LAMINAR ARTICLES OF POLYOLEFIN AND NYLON/POLYVINYL ALCOHOL BLEND AND METHODS RELATED THERETO

[75] Inventor: Irene Greenwald Plotzker, Wilmington, Del.

[73] Assignee: E.I. du Pont de Nemours and Company, Wilmington, Del.

[21] Appl. No.: 09/047,094

[22] Filed: Mar. 24, 1998

[51] Int. Cl.$^6$ ...................................................... B29D 22/00
[52] U.S. Cl. ........................ 428/35.7; 428/36.7; 428/516; 428/518; 428/520; 428/475.8; 428/476.9
[58] Field of Search .................................. 428/36.7, 35.7, 428/516, 518, 520, 475.8, 476.9

[56] References Cited

U.S. PATENT DOCUMENTS 4,410,482  10/1983  Subramanian ........................... 264/515
4,950,513  8/1990   Mehra ..................................... 428/36.7

FOREIGN PATENT DOCUMENTS 0 015 556  4/1984  European Pat. Off. ........ C08L 23/00

*Primary Examiner*—Leszek Kiliman
*Attorney, Agent, or Firm*—Patricia L. Kelly

[57] ABSTRACT

A laminar shaped article which exhibits substantial improvement in the fluid barrier properties over the laminate of the prior art. The article comprises a heterogeneous blend of: (a) polyolefin with (b) a melt blend of a nylon and a polyvinyl alcohol component, and a compatibilizer(c), which is either: i) a mixture of two different alkylcarboxyl-substituted polyolefins which serves as a compatibilizer; or ii) a small amount of alkylcarboxyl-substituted polyolefin with a small amount of grafted maleic anhydride moieties; or iii) a high weight percent of alkylcarboxyl-substituted polyolefin with a high graft level of grafted maleic anhydride moieties.

11 Claims, 2 Drawing Sheets

LAMINAR ARTICLES OF POLYOLEFIN AND NYLON/POLYVINYL ALCOHOL BLEND AND METHODS RELATED THERETO

BACKGROUND OF THE INVENTION

1. Field of the Invention

The present invention relates to a heterogeneous blend of a polyolefin and a nylon/polyvinyl alcohol blend, and to articles of such blend, especially in the form of barriers to permeation of fluid, liquid and gaseous, materials.

2. Description of Related Art

Laminar articles derived from a blend of polyolefin and nylon or nylon/polyvinyl alcohol blends have been used as fuel tanks for motor vehicles, providing a barrier minimizing the diffusion of hydrocarbons and oxygenated compounds in the fuel through the walls of the tank. U.S. Pat. No. 4,410,482 describes laminar articles of a polyolefin and a condensation polymer. European Patent Application No. 0015556 describes laminar articles in which the nylon barrier resin has been replaced with polyvinyl alcohol or ethylene/vinyl alcohol copolymers.

U.S. Pat. No. 4,950,513 describes a laminar article with improved barrier properties to oxygenated and hydrocarbon compounds. The article is prepared by blending about 60 to about 97 weight percent polyolefin with a melt blend of about 2 to about 39 weight percent nylon and a polyvinyl alcohol component, and using about 0.25 to about 12 weight percent of an alkylcarboxyl-substituted polyolefin as a compatibilizer. The compatibilizer is prepared by grafting and has about 0.01 to about 20 weight percent graft monomer. The fluid barrier properties of an article made thereby are reported to be excellent, particularly in tests employing methanol/xylene mixtures.

Recent changes in emission regulations have led to the addition of ethanol to the hydrocarbon fuels. The loss of a fuel mixture of oxygenated compounds and hydrocarbons by diffusion through the walls of a container with a laminar structure of polyolefin and nylon has in general been found to be sufficiently great as to be unacceptable from an environmental standpoint. Thus there is a need for improved containers for the storage of mixtures of hydrocarbons and oxygenated compounds, such as gas tanks and cans.

SUMMARY OF THE INVENTION

The subject invention provides a laminar shaped article comprising a heterogeneous blend of: (a) polyolefin with (b) a melt blend of a nylon and a polyvinyl alcohol component, and (c) a mixture of two different alkylcarboxyl-substituted polyolefins A and B which serves as a compatibilizer, wherein the blend (b) is present in the polyolefin (a) as a multitude of overlapping layers; and the ratio of A:B is in the range of about 3:1 to about 1:3.

The subject invention further provides a laminar shaped article comprising a heterogeneous blend of: (a) a polyolefin with (b) a melt blend of a nylon and a polyvinyl alcohol component, and (c) a compatibilizer, which is either: i) a small amount of alkylcarboxyl-substituted polyolefin with a small amount of grafted maleic anhydride moieties; or ii) a high weight percent of alkylcarboxyl-substituted polyolefin with a high graft level of grafted maleic anhydride moieties, and wherein the blend (b) is present in the polyolefin (a) as a multitude of overlapping layers.

DESCRIPTION OF THE INVENTION

Figure 1:
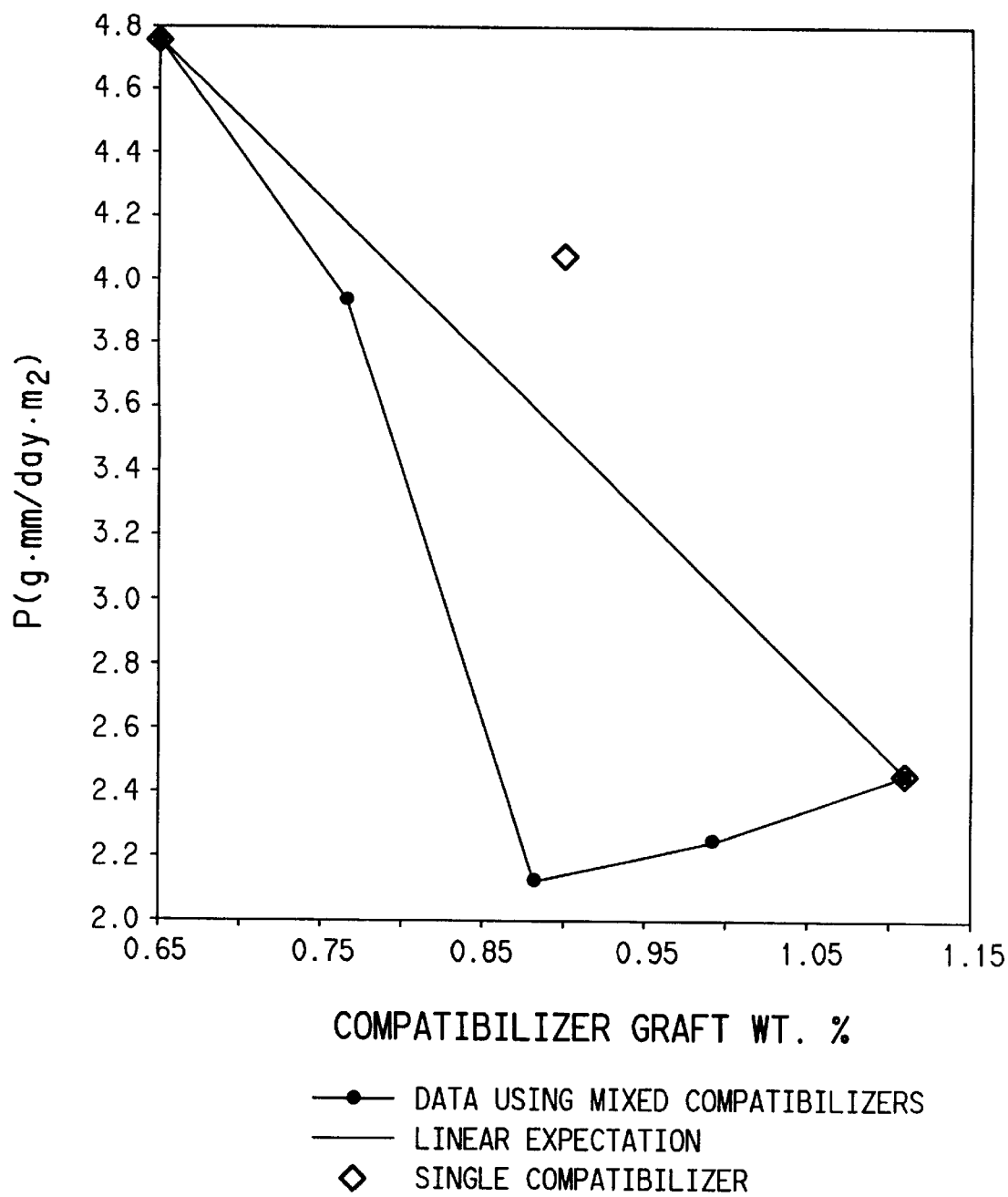
FIG. 1 compares observed barrier permeability for a mixture of two compatibilizers with permeability for a single compatibilizer.

The laminar shaped article of the present invention, generally, is made from a mixture of two incompatible polymers and a compatibilizer which serves to adhere together adjacent domains of the incompatible polymers. The product is made by mixing together particles of the polymers, heating the mixture to yield a heterogeneous melt of material, and forming the melt in such a way which results in stretching the melt to yield an elongated discontinuous polymer phase.

The first incompatible polymer is a polyolefin, (a), used in preparing the laminate of the present invention and includes polyethylene, polypropylene, polybutylene, related copolymers and the like. Polyethylene is preferred and may be high, medium or low density.

Component (b), incompatible with the polyolefin, is a melt blend of one or more nylons and polyvinyl alcohol or copolymers thereof. Useful nylons (polyamides) include both semi-crystalline and amorphous polymers. Polyamides are well known and are made by reacting carboxylic acids with primary amines under well-known conditions. Examples of carboxylic acids used in polyamide preparation are adipic acid, suberic acid, sebacic acid, azelaic acid, malonic acid, glutaric acid, pimelic acid, and the like. Examples of primary amines are tetramethylene diamine, pentamethylene diamine, hexamethylene diamine, octamethylene diamine, and the like.

Preferred polyamides include those semi-crystalline and amorphous resins having a molecular weight of a least 5000 and commonly referred to as nylons. The polyamide resin can be produced by condensation of equimolar amounts of a saturated dicarboxylic acid containing from 4 to 12 carbon atoms with a diamine containing 4 to 14 carbon atoms. Examples of polyamides include polyhexamethylene adipamide (66 nylon), polyhexamethylene azelamide (69 nylon), polyhexamethylene sebacamide (610 nylon), polyhexamethylene dodecanoamide (612 nylon), poly-11-aminoundecanoic acid, and bis(p-aminocyclohexyl)methane dodecanoamide, and polyamides produced by ring opening of lactams, e.g., polycaprolactam, polylauric lactam. Polycaproamide and a copolyamide of adipic acid, hexamethylene diamine and caprolactam are preferred.

The other material used in Component (b) is polyvinyl alcohol or a related copolymer or mixtures thereof. All of these polymers are normally made by polymerizing vinyl acetate alone or copolymerizing it with other monomers followed by saponification to obtain the corresponding polyvinyl alcohol homopolymer or copolymer. For use in the present invention the degree of saponification should be greater than 95% and preferably at least 99%. Typically these polymers have number average molecular weights of about 20,000 to 80,000 but their molecular weight is not critical to this invention.

For preparing Component (b), polyvinyl alcohol may be used alone (which is preferred), or copolymers containing up to about 10 weight percent of methyl acrylate or methyl methacrylate or other lower alkyl (meth)acrylates may be used. Blends of two or more of these polymers may also be used. Ethylene/vinyl alcohol copolymers containing up to 50 mole percent ethylene can be used in combination with the aforementioned polyvinyl alcohol or its (meth)acrylate copolymers. The use of ethylene/vinyl alcohol copolymers alone (that is, in the absence of polyvinyl alcohol) is not contemplated because such copolymers by themselves do not provide adequate barrier properties towards fuel mixtures. The ethylene/vinyl alcohol copolymers can be used in amounts of up to 50 weight percent with polyvinyl alcohol or its (meth)acrylate copolymers.

Component (b), the melt blend, will preferably contain about 10–60 weight percent of at least one nylon and about 40–90 weight percent of polyvinyl alcohol or suitable copolymer thereof. Most preferably component (b) will contain about 20–35 weight percent of at least one nylon and about 65–80 weight percent of polyvinyl alcohol or suitable copolymer thereof. In preparing the melt blend it may be advantageous to incorporate a minor amount of a plasticizer compatible with the polyvinyl alcohol (PVOH) to improve processing of the blend. Other process aids and antioxidants can be added.

The melt blend comprising Component (b) is conveniently prepared by mixing a dry blend of nylon and polyvinyl alcohol or its copolymers in an extruder at a temperature above the melting point of the higher melting component. The material leaving the extruder is preferably stranded, chilled and cut into pellets which are particularly useful for preparing the articles of this invention. Other methods of preparing the melt blend may be contemplated by those skilled in the art.

Component (c) serves as a compatibilizer. Though not bound by any particular mechanism, it is believed that component (c) adheres together adjacent layers of the polyolefin and the melt blend of nylon/polyvinyl alcohol. The use of a compatibilizer is important, because in its absence, it appears that the polymer layers making up the laminar article do not adhere to one another and the article does not have useful, mechanical properties. The compatibilizer of the present invention is an alkylcarboxyl-substituted polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Compatibilizers can be prepared by direct synthesis or by grafting. An example of direct synthesis is the polymerization of an alpha-olefin with an olefinic monomer having a carboxylic moiety, and an example of grafting is the addition of a monomer having a carboxylic moiety to a polyolefin backbone.

In a compatibilizer made by grafting, the polyolefin is polyethylene or a copolymer of ethylene and at least one alpha-olefin of 3–8 carbon atoms such as propylene, and the like, or a copolymer including at least one alpha-olefin of 3–8 carbon atoms and a non-conjugated diolefin, such as 1,4-hexadiene, and the like. The polyolefin is reacted with an unsaturated carboxylic acid, anhydride, or ester monomer to obtain the grafted polymer. Representative acids, anhydrides, and esters include methacrylic acid, acrylic acid, ethacrylic acid, glycidyl methacrylate, 2-hydroxy ethylacrylate, 2-hydroxy ethyl methacrylate, diethyl maleate, monoethyl maleate, di-n-butyl maleate, maleic anhydride, maleic acid, fumaric acid, itaconic acid, monoesters of such dicarboxylic acids, dodecenyl succinic anhydride, 5-norbornene-2,3-anhydride, nadic anhydride (3,6-endomethylene-1,2,3,6-tetrahydrophthalic anhydride), and the like.

In a compatibilizer made by direct synthesis, the polymeric material is a copolymer of alpha-olefin of 2–10 carbon atoms and an alpha, beta-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component. Ionomeric compatibilizer is preferably made from directly synthesized compatibilizer, and is preferably made up of about 90 to 99 mole percent olefin about 1 to 10 mole percent alpha, beta-ethylenically unsaturated monomer having carboxylic moieties wherein the moieties are considered as acid equivalents and are neutralized with metal ions having valences of 1 to 3, inclusive, where the carboxylic acid equivalent is monocarboxylic, and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative alpha-olefins and unsaturated carboxylic acid, anhydride, and ester monomers are those previously herein described.

As to the proportions of the components for practicing the invention in the first preferred embodiment, the polyolefin (a) is preferably present in amounts of about 60 to about 97 percent, most preferably about 80 to about 96 percent. The incompatible, condensation component (b) which is to be a discontinuous phase in the shaped article is preferably present in amounts of about 2 to about 39 weight percent, and most preferably about 2 to about 15 weight percent. Component (c) is preferably a mixture of two different alkylcarboxyl-substituted polyolefins (I) and (II) present in amounts of about 0.25 to about 12 weight percent total, with: i) the ratio of (I):(II) being in the range of 1:3 to 3:1; and ii) each alkylcarboxyl-substituted polyolefin having from about 0.25 to about 2 weight percent of maleic anhydride moieties onto a polyethylene backbone.

As for the second preferred embodiment, the proportions of components (a) and (b) are the same as for the first preferred embodiment: 1) the polyolefin (a) is preferably present in amounts of about 60 to about 97 percent, most preferably about 80 to about 96 percent; 2) the pre-formed melt blend of nylon/polyvinyl alcohol polymer (b) provides the discontinuous phase and is used in amounts of about 2 to about 39 weight percent, and most preferably about 2 to about 15 weight percent; 3) component (c) is preferably in one of two selective ranges: i) a combination of a low weight percent of 0.25% to about 3% compatibilizer and a low graft level of about 0.25% to about 0.80% graft polymer; or ii) a combination of a high percentage of about 5% to 7% compatibilizer having a high graft level of about 1.0 to 1.5% graft polymer.

Any of the components can be used to introduce inert fillers into the composition provided only that the fillers are not a kind or in an amount which would interfere with the formation of the layered construction or with the desired or required properties of composition. Opacifiers, colorants, lubricants, stabilizers, and the like which are ordinarily used in structural polymeric materials can also be used herein. The amount of such filler is not included in the calculation of amounts of incompatible polymers and compatibilizers.

The articles of the present invention are preferably made by mixing together particles of the polyolefin, particles of the previously prepared melt blend of nylon/polyvinyl alcohol and particles of the compatibilizer, heating the mixture to yield a heterogeneous melt of material and forming the melt in a way which results in stretching the melt to yield an elongated discontinuous polymer phase consisting of the nylon/polyvinyl alcohol polymer blend.

In the first mixing step, it is desired that both, the polyolefin and the condensation polymer should be mixed as particles. The particles should, as a general rule, be of a size, such that, the molten blend of incompatible polymers, when introduced to some melt stretching means, such as extrusion die lips, exhibits the heterogeneity necessary for practice of the invention. If the particles are of too small a size, the melted blend tends to function as a homogeneous composition because the domains of material making up the discontinuous polymer phase are so small. If the particles are of too large a size, the melted blend tends to form into shaped articles having a marbleized structure rather than a laminar structure. The particles are preferably generally regular in shape, such as cubical or spherical or the like. The particles may, however, be irregular. The compatibilizer (c) can be provided as individual particles, or can be mixed into, coated onto, or otherwise combined with one or both of the incompatible polymers (a) and (b). Mixing the particle components can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand. The only requirement of the mixing is that any two statistical samplings of the mixture in a given mass of material should yield substantially the same composition.

Once mixed, the incompatible polymers are heated to a temperature greater than the melting point of the highest melting polymer component. It is noted that the heating is conducted for the purpose of stretching the softened or melted blend. In the case of an incompatible polymer which exhibits no well-defined melting temperature, "melting temperature" refers to a temperature at least high enough that the polymers have been softened to the degree required to stretch each of the polymers in the blend. The heating must be conducted in a manner which avoids substantial additional mixing of the incompatible polymers causing homogenization and combination of the melted particles and a shaped article of homogeneous, unlayered composition. The heating can be conducted by any of several well-known means and is usually conducted in an extruder.

The forming step requires stretching of the melted blend followed by cooling. Stretching is an elongation of the two phase melt to cause a substantial change in the dimensions of the particles in the discontinuous phase. The melt can be stretched by being squeezed between rollers or pressed between platens or extruded between die lips. Molding processes such as blow molding also cause stretching in accordance with this process. In the manufacture of containers as shaped articles, the stretching can be accomplished by a combination of extruding a blend of the heterogeneous melt to yield a container preform or parison followed by blow molding the parison into a finished container. The stretching can be in one direction or in perpendicular directions. Whether the stretching is conducted in one direction or two, there should be an elongation of from 100 to 500 percent in at least one direction; and an elongation of from 100 to 300 percent is preferred.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

The blends and laminates of the present invention may be used as containers for hydrocarbon and oxygen-containing liquids, and also may be used to form sheets, films, tubes, pipes, and the like. A particularly contemplated use is for fuel tanks for motor vehicles. The attributes of the laminates of the subject invention will be more fully appreciated by reference to the examples that follow.

Description of the Preferred Embodiments

In the examples that follow including the control example, blends were made comprising high-density polyethylene (HDPE), barrier resin, and compatibilizer either as a single polymer or a mixture of two graft polymers. The HDPE has density of about 0.953 g/cc, a melt index of 10 gram/10 min. as determined according to ASTM D-1238 (condition F). The barrier resin comprises 74% by weight plasticized PVOH and 26% nylon 6 or nylon 6,66 copolymer. PVOH has a number average molecular weight of approximately 30,000 and a 99% degree of saponification with a low sodium acetate level of less than 0.1% as ash. The PVOH was blended with 10% triethylene glycol as plasticizer. The pellets were then melt-blended with the nylon copolymer in a single screw extruder at about 230° C. to yield a nylon/PVOH melt-blend. The barrier resin material exiting the extruder was pelletized.

Various compatibilizers were used in the examples with various different graft levels. The compatibilizers are alkylcarboxyl-substituted polyolefins obtained by melt-grafting fumaric acid onto a HDPE having a density of 0.958 g/cc and a melt index of either about 10–14 or about 2–4, as determined according to ISO 1113, available from E.I. DuPont de Nemours of Wilmington, Del. The alkylcarboxyl-substituted polyolefins were prepared with graft levels of about 0.65, 0.9, 1.1, and 1.25 weight percent based on the total weight of the polymer.

In all examples, the blend mixture of HDPE, barrier resin, and compatibilizer(s) was fed into Rocheleau Model 7A continuous extrusion blow molding machine equipped with a 2:1 compression ratio screw (diam. 38.1 mm) without any mixing tip. Bottles with a capacity of approximately 450 milliliters (16 ounces) were blow molded at an extrusion temperature of about 225°–230° C. The side walls were about 1 mm thick, and showed laminar distribution of the barrier resin, i.e., the (co)polyamide/PVOH blend.

Visual testing of the bottles was conducted by inspection, with and without the use of an optical microscope, of edge slices of material from the bottles. The bottles exhibited a laminar structure of barrier resin layers distributed through the bottle wall thickness. Edge slices of the bottle walls viewed through cross polarized light filters clearly evidenced laminar distribution of the barrier resin throughout.

Barrier to permeation was tested by filling the bottle about 60% full with a mixture of either methanol/xylene or ethanol/xylene and determining the weight loss over a period of several weeks. The bottles were weighed periodically and their weight loss was plotted against time and average steady state weight loss was determined for each run. Based on the known weight of the container and its geometry, the surface area and average thickness was calculated (ASTM-2684). The permeability values (P) were calculated to be:

$$P = \frac{\text{Average rate of weight loss (grams/day)}*}{\frac{\text{Average bottle thickness (mm)}}{\text{Average bottle external surface area (m}^2)}}$$

Impact strength was determined by dropping bottles kept frozen at a temperature of −25° C. from a height of 20 feet to determine the impact of the drop on the integrity of the bottles at subfreezing temperatures.

I. Effectiveness of a Mixture of Compatibilizers.

For all examples in example sets A, B, C, and D, the weight proportions of the components are as follows: 89.2% HPDE, 4% barrier resin comprising 74% by weight plasticized PVOH and 26% nylon 6,66 copolymer, and 6.8% compatibilizer. The compatibilizer is either as a single graft polymer, or a mixture of two graft polymers, prepared as described above. The bottles were filled with a mixture of 10% by volume of ethanol in xylene and permeability tests were carried out until permeability had reached a steady state value in about 32 days. Impact testing was performed on all bottles as well. All bottles survived the impact drop test. The examples employing a mix of two compatibilizers show unexpected and surprising barrier test results, with the permeability property of the mixed blend being substantially improved over the predicted permeability for a blend employing only one compatibilizer, as shown in Table 1.

The "Average" or "Computed wt. % graft" in all examples are computed as follows:

$$\text{Ave \%} = \frac{(\text{wt \% A} * \text{\% graft A}) + (\text{wt \% B} * \text{\% graft B}) + (\text{wt \% C} * \text{\% graft C}) + (\text{wt \% D} * \text{\% graft D})}{(\text{Wt. \% A} + \text{Wt. \% B} + \text{Wt. \% C} + \text{Wt. \% D})}$$

TABLE 1

| Example | Wt. % A w/ .65% graft | Wt. % B w/ 1.10% graft | Wt. % C w/ 0.90% graft | Wt. % D w/ 1.25% graft | Computed (Ave.) wt. % graft | Perm. g-mm/ day-m² | Expected Perm. |
|---|---|---|---|---|---|---|---|
| A1 | — | — | — | 6.80 | 1.250 | 2.60 | — |
| A2 | 3.40 | — | — | 3.40 | 0.950 | 2.44 | 6.340 |
| A3 | 6.80 | — | — | — | 0.650 | 10.08 | — |
| B1 | — | — | — | 6.80 | 1.250 | 2.60 | — |
| B2 | — | — | 3.40 | 3.40 | 1.075 | 2.60 | 3.070 |
| B3 | — | — | 6.80 | — | 0.900 | 3.54 | — |
| C1 | — | — | — | 6.80 | 1.250 | 2.60 | — |
| C2 | — | 3.40 | — | 3.40 | 1.175 | 2.36 | 2.615 |
| C3 | — | 6.80 | — | — | 1.100 | 2.63 | — |

Another set of examples D1–D6 were completed to confirm the unexpected and superior results of the mix of two compatibilizers. For these examples, the bottles were from a blend mix of: a) 93% weight percent HPDE; b) 4.8% barrier resin of 74% by weight plasticized PVOH and 26% nylon 6,66 copolymer; and c) 1.9% weight percent compatibilizer either as a single graft polymer or a mixture of two. The compatibilizer in examples D1–D5 is either an alkylcarboxyl-substituted polyolefin polymer having a graft level of either 0.650% or 1.11%, or a mixture of these two alkylcarboxyl-substituted polyolefins. The compatibilizer in example D6 is a single graft polymer having a graft level of 0.9%. The bottles were filled with a mixture of 10% by volume of ethanol in xylene and permeability tests were carried out until permeability had reached a steady state value at about 34 days.

As in the previous examples, the mix employing two compatibilizers show unexpected and surprising results with the permeability property of the mixed blend being substantially better than the permeability for a blend employing only one compatibilizer, i.e., comparing examples D3 and D6 with approximately the same computed (or effective) weight % graft in the blend of about 0.9. The results shown in Table 2 also indicate that the optimum blend is about 1:1 ratio.

TABLE 2

| Example | Wt. % A w/ 0.65% graft | Wt. % B w/ 0.90% graft | Wt. % C w/ 1.10% graft | Computed wt. % graft in blend | Observed Perm. g-mm/day-m² |
|---|---|---|---|---|---|
| D1 | 1.900 | — | — | 0.650 | 4.77 |
| D2 | 1.425 | — | 0.475 | 0.765 | 3.93 |
| D3 | 0.950 | — | 0.950 | 0.880 | 2.12 |
| D4 | 0.475 | — | 1.425 | 0.987 | 2.25 |
| D5 | — | — | 1.900 | 1.110 | 2.43 |
| D6 | — | 1.90 | — | 0.900 | 4.08 |

The results of experiments D1–D6 are also plotted in FIG. 1, which compares the unexpectedly low barrier permeability observed for a mixture of two compatibilizers with a single compatibilizer over a range of compatibilizer levels.

The next set of tests E9–E11 called for a blend of 93% HPDE, 4.2% barrier resin of 74% by weight plasticized PVOH and 26% nylon polymer, and 2.8% compatibilizer as a single graft polymer or a mixture of two. In the examples, nylon 6 was used instead of nylon 6,66 copolymer so that the results can be directly compared with example 6 in U.S. Pat. No. 4,950,513 with a single compatibilizer of 0.9% graft polymer used. The barrier tests in E9–E11 were done under the same condition using a mixture of 15% volume methanol in xylene at 40° C. with a 60% fill and extrapolated to room temperature by dividing the permeability at 40° C. by 4. Again, the results as shown in Table 3 demonstrate that a blend of two compatibilizers gives a surprising and unexpectedly lower permeability than control mixes using only one compatibilizer of the same effective graft level. It should be noted that in the prior art U.S. Pat. No. 4,950,513, example 6 utilizing 2.8g of a single compatibilizer with 0.9% graft level, gave a permeability of 3.90 g-mm/day-m², almost twice the observed result 1.87 g-mm/day m² for a mix of the present invention of two compatibilizers with an effective average graft level of 0.875%.

TABLE 3

| Example | Wt. % A w/ 0.65% graft | Wt. % C w/ 1.10% graft | Computed wt. % graft in blend | Observed Perm. g-mm/ day-m² |
|---|---|---|---|---|
| E9 | — | 2.80 | 1.110 | 2.73 |
| E10 | 1.400 | 1.400 | 0.875 | 1.87 |
| E11 | 2.800 | — | 0.650 | 2.48 |

II. Effectiveness of Selected Compatibilizer Ranges.

In examples F12 and F13, blends were made with 4.2 weight % barrier resin of 74% by weight plasticized PVOH and 26% nylon 6 polymer. However, the compatibilizer levels were set to be outside of the preferred limits of 2–5 weight percent in the prior art examples in U.S. Pat. No. 4,950,513. The levels were 1.4% of a single compatibilizer having a graft level of 0.65% for example F12 and 6.8% of a single compatibilizer having a graft level of 1.25% for example F13. The rest of the blend in weight percent is HDPE. The barrier tests were done under the same conditions as in the prior art (U.S. Pat. No. 4,950,513), using a mixture of 15% volume methanol in xylene at 40° C. with a 60% fill and extrapolated to room temperature by dividing the permeability at 40° C. by 4. The examples as shown in Table 4 demonstrate that significant and unexpected barrier permeability can be achieved outside of the preferred ranges in the prior art.

For purpose of illustration, the examples were compared with example 6 in the prior art U.S. Pat. No. 4,950,513, which employed a blend of 93% HPDE, 4.2% barrier resin of 74% by weight plasticized PVOH and 26% nylon copolymer, and 2.8% compatibilizer with 0.90% graft. The prior art result showed a permeability level of 3.90 g-mm/day-m$^2$, which is well above the surprising results shown in the table with ranges outside the 2–5% preferred limit of the prior art.

TABLE 4

| Example | Wt. % A w/ 0.65% graft | Wt. % B w/ 1.10% graft | Wt. % C w/ 0.90% graft | Wt. % D w/ 1.25% graft | Computed % graft | Perm. g-mm/day-m$^2$ |
|---|---|---|---|---|---|---|
| F12 | 1.5 | — | — | — | 0.65 | 2.58 |
| F13 | — | — | — | 6.80 | 1.25 | 2.43 |

Additional investigations were set up in a statistical design based on three variables: 1) weight percent barrier resin in the blends; 2) weight percent of the compatibilizer in the blends; and 3) the degree of grafting in the compatibilizer expressed as weight percent maleic anhydride graft. The blends were a mixture of 74:26 plasticized PVOH:nylon 6,66 ("barrier resin") pellets, maleic anhydride grafted HDPE pellets ("compatibilizer") and the rest in weight percent is HDPE. The bottles were filled with 10 volume percent ethanol in xylene at 40° C. for 29 days.

The experimental design was generated using RS/Discover®, a software product commercially available from BNN Software Products of Cambridge, Mass., USA, employing a D-Optimal design as described in "Empirical Model-Building And Response Surfaces" by G. E. P. Box and N. R. Draper, published by John Wiley & Sons, New York, USA (1987).

Figure 2:
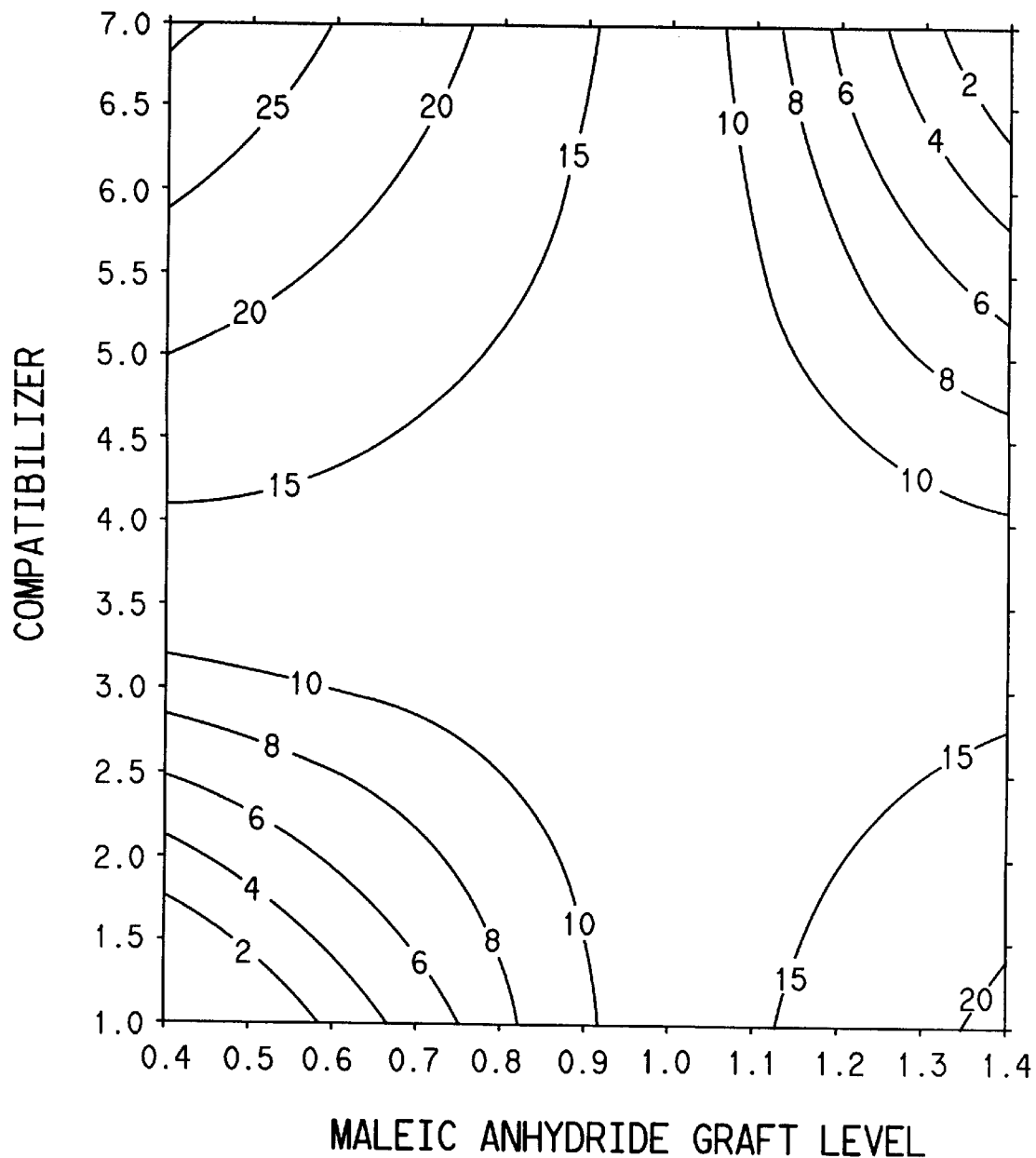
FIG. 2 is a contour plot from the results of the statistically designed experiments, showing the areas of lowest barrier permeability.

The results of the designed experiment are shown in table 5 below. The results were also analyzed by RS/Discover® to compare observed permeabilities and permeabilities predicted by the resulting regression equation ("Computed Perm."). FIG. 2 is a contour plot showing the results of the design experiments (at a barrier resin level of 4 weight %), showing that the areas of lowest barrier permeability are selective combinations of either: a) low graft level/low compatibilizer weight level, or b) high graft level/high compatibilizer weight level.

TABLE 5

| Example | Barrier resin Wt. % | Comp. Wt. % | Wt. % graft maleic anhydride | Observed Perm. g-mm/day m$^2$ | Computed Perm. g-mm/day m$^2$ |
|---|---|---|---|---|---|
| CE 14 | 3.2 | 2.9 | 1.1 | 8.31 | 9.53 |
| CE 15 | 3.2 | 3.8 | 1.1 | 7.52 | 7.32 |
| CE 16 | 3.2 | 5.7 | 0.9 | 4.21 | 3.65 |
| CE 17 | 1.6 | 1.9 | 0.9 | 23.4 | 23.1 |
| CE 18 | 1.6 | 5.7 | 0.9 | 14.8 | 15.4 |
| CE 19 | 1.6 | 1.9 | 1.25 | 31.0 | 30.8 |
| CE 20 | 1.6 | 5.7 | 1.25 | 18.2 | 18.1 |
| 21 | 4.8 | 1.9 | 0.9 | 4.21 | 3.65 |
| CE 22 | 4.8 | 1.9 | 1.25 | 4.25 | 3.83 |

TABLE 5-continued

| Example | Barrier resin Wt. % | Comp. Wt. % | Wt. % graft maleic anhydride | Observed Perm. g-mm/day m$^2$ | Computed Perm. g-mm/day m$^2$ |
|---|---|---|---|---|---|
| CE 23 | 4.8 | 3.8 | 0.9 | 5.08 | 5.94 |
| 24 | 4.8 | 5.7 | 1.1 | 5.47 | 5.47 |
| 25 | 4.8 | 5.7 | 1.25 | 3.30 | 3.83 |

From the analysis, additional experiments were conducted with the weight percent of the compatibilizer in the blends and the degree of grafting in the compatibilizer expressed as weight percent being outside the experimental ranges. The additional examples, as shown in Table 6, confirmed the surprising and substantially improved barrier property for the selective combinations predicted by the design experiments of either: a) small amount of a compatibilizer with little maleic anhydride grafted; or b) large amount of compatibilizer with a relatively high level of grafted maleic anhydride:

TABLE 6

| Example | Barrier resin Wt. % | Comp. Wt. % | Wt. % graft maleic anhydride | Barrier Perm. g-mm/day m$^2$ |
|---|---|---|---|---|
| 26 | 4.8 | 1.9 | 0.65 | 4.76 |
| 27 | 4.0 | 6.8 | 1.25 | 2.03 |

As is apparent from the foregoing description, the materials prepared and procedures followed relate only to specific embodiments of the broad invention. While forms of the invention have been illustrated and described, modifications can be made without departing from the spirit and scope of the invention. Accordingly, it is not intended that the invention be limited thereby.

I claim:

1. A laminar article comprising a combination of:
    (a) a polyolefin;
    (b) a melt blend of a polyamide and a polyvinyl alcohol component; and
    (c) a blend of at least two different alkylcarboxyl-substituted polyolefins A and B, each comprising about 0.25 to about 2.0 weight percent maleic anhydride moieties on a polyethylene backbone;
    wherein:
    (i) the blend (b) is present in the polyolefin (a) as a multitude of overlapping layers; and
    (ii) the ratio of A:B is in the range of about 3:1 to about 1:3.

2. The article of claim 1 wherein the polyolefin (a) is present at about 60 to about 97 weight percent, the blend of polyamide and a polyvinyl alcohol component (b) is present at about 2 to about 39 weight percent, and the blend (c) of at least two alkylcarboxyl-substituted polyolefins is present at about 0.25 to about 12 weight percent.

3. The article of claim 2 wherein the polyolefin is polyethylene.

4. The article of claim 2 wherein the blend (b) comprises about 10 to about 60 percent polyamide and about 40 to about 90 percent polyvinyl alcohol component.

5. The article of claim 2 wherein the polyvinyl alcohol component comprises about 50 to about 100 percent by weight of a polymer selected from the group consisting of (i) polyvinyl alcohol, (ii) saponified copolymers of vinyl acetate containing up to about 10 percent by weight of lower alkyl acrylate or lower alkyl methacrylate, and (iii) mixtures thereof, and about 0 to about 50 percent by weight of an ethylene-vinyl alcohol copolymer containing up to about 50 weight percent of ethylene.

6. A laminar article comprising a combination of:
   (a) a polyolefin;
   (b) a melt blend of a polyamide and a polyvinyl alcohol component; and
   (c) an alkylcarboxyl-substituted polyolefin;
   wherein:
   (i) the polyolefin (a) is present at about 60 to about 97 weight percent;
   (ii) the blend of polyamide and polyvinyl alcohol component (b) is present at about 2 to about 15 weight percent; and
   (iii) the alkylcarboxyl-substituted polyolefin (c) is present either: A) at about 0.25 to about 1.9 weight percent as a graft of about 0.25 to about 0.9 weight percent maleic anhydride moieties on a polyethylene backbone; or B) at about 4.5 to about 7 weight percent as a graft of about 1.0 to about 1.5 weight percent maleic anhydride moieties on a polyethylene backbone.

7. The laminar article of claim 6 in the form of a container.

8. The laminar article of claim 7 wherein the container is a fuel tank for motor vehicles.

9. A laminar article comprising a combination of:
   (a) a polyolefin;
   (b) a melt blend of a polyamide and a polyvinyl alcohol component; and
   (c) an alkylcarboxyl-substituted polyolefin;
   wherein:
   (i) the blend (b) is present in the polyolefin (a) as a multitude of overlapping layers;
   (ii) the polyolefin (a) is present at about 60 to about 97 weight percent;
   (iii) the blend of polyamide and polyvinyl alcohol component (b) is present at about 2 to about 15 weight percent; and
   (iv) the alkylcarboxyl-substituted polyolefin (c) is present either: A) at about 1.4 to about 1.9 weight percent as a graft of about 0.65 to about 0.9 weight percent maleic anhydride moieties on a polyethylene backbone; or B) at about 4.5 to about 7 weight percent as a graft of about 1.0 to about 1.5 weight percent maleic anhydride moieties on a polyethylene backbone.

10. The laminar article of claim 9 in the form of a container.

11. The laminar article of claim 10 wherein the container is a fuel tank for motor vehicles.

* * * * *